(12) United States Patent
Cheng et al.

(10) Patent No.: US 10,805,147 B2
(45) Date of Patent: Oct. 13, 2020

(54) FAIL RECOVERY METHOD AND INTERNET OF THINGS SYSTEM AND CHARGING SYSTEM USING THE SAME

(71) Applicants: Tatung Company, Taipei (TW); TATUNG UNIVERSITY, Taipei (TW)

(72) Inventors: Fu-Chiung Cheng, Taipei (TW); Wei-Cheng Liu, Taipei (TW); Tai-Jee Pan, Taipei (TW)

(73) Assignees: Tatung Company, Taipei (TW); TATUNG UNIVERSITY, Taipei (TW)

( * ) Notice: Subject to any disclaimer, the term of this patent is extended or adjusted under 35 U.S.C. 154(b) by 326 days.

(21) Appl. No.: 15/247,928

(22) Filed: Aug. 26, 2016

(65) Prior Publication Data
US 2017/0063605 A1 Mar. 2, 2017

Related U.S. Application Data

(60) Provisional application No. 62/210,421, filed on Aug. 26, 2015.

(30) Foreign Application Priority Data

Jul. 19, 2016 (TW) .............................. 105122779 A

(51) Int. Cl.
*H04L 12/24* (2006.01)
*H04L 29/08* (2006.01)
(Continued)

(52) U.S. Cl.
CPC .......... *H04L 41/0668* (2013.01); *H04L 12/66* (2013.01); *H04L 43/0829* (2013.01);
(Continued)

(58) Field of Classification Search
CPC . H04L 41/0668; H04L 12/66; H04L 43/0829; H04L 45/22; H04W 4/70
(Continued)

(56) References Cited

U.S. PATENT DOCUMENTS 6,381,218 B1 4/2002 McIntyre et al.
6,813,634 B1 * 11/2004 Ahmed ............... H04L 43/0817
709/202
(Continued)

FOREIGN PATENT DOCUMENTS

CN 101695440 4/2010
CN 101867530 10/2010
(Continued)

OTHER PUBLICATIONS

"Office Action of Taiwan Counterpart Application", dated Jun. 5, 2018, p. 1-p. 4.
(Continued)

*Primary Examiner* — Meng Vang
(74) *Attorney, Agent, or Firm* — JCIPRNET

(57) ABSTRACT

A fail recovery method and an Internet of Things (IoT) system and a charging system using the same are provided. The fail recovery method includes following steps: providing a plurality of gateway devices, in which at least one of the gateway devices preset to provide a wireless network service to at least one IoT device and at least another one of the gateway devices preset to provide the wireless network service to at least one user device; mutual confirming an operation state of other one of gateway devices by the gateway devices; and when the one of the gateway devices is determined as failed, using the another one of the gateway devices to replace the failed gateway device, so as to simultaneously provide the wireless network service to the IoT device and the user device by the another one of the gateway devices.

21 Claims, 10 Drawing Sheets

(51) Int. Cl.
*H04L 12/66* (2006.01)
*H04L 12/26* (2006.01)
*H04L 12/707* (2013.01)
*H04W 4/70* (2018.01)

(52) U.S. Cl.
CPC .............. *H04L 45/22* (2013.01); *H04L 67/10* (2013.01); *H04L 67/125* (2013.01); *H04W 4/70* (2018.02); *H04L 43/10* (2013.01)

(58) Field of Classification Search
USPC ........................................................ 709/224
See application file for complete search history.

(56) References Cited

U.S. PATENT DOCUMENTS

| | | | | |
|---|---|---|---|---|
| 2004/0139179 | A1* | 7/2004 | Beyda ................... | H04L 45/02 709/221 |
| 2006/0047836 | A1* | 3/2006 | Rao ..................... | H04L 63/0272 709/229 |
| 2006/0253575 | A1* | 11/2006 | Carter .................. | G06F 11/203 709/224 |
| 2009/0252032 | A1 | 10/2009 | Jiang et al. | |
| 2009/0319656 | A1* | 12/2009 | Yang .................... | H04L 41/065 709/224 |
| 2013/0232259 | A1* | 9/2013 | Csaszar .............. | H04L 43/0817 709/224 |
| 2016/0049823 | A1* | 2/2016 | Stein ................... | H02J 7/025 320/108 |
| 2016/0179638 | A1* | 6/2016 | Berry ................. | G06F 11/2005 714/4.12 |
| 2016/0191357 | A1* | 6/2016 | Orner ................... | H04W 24/02 370/328 |
| 2016/0227360 | A1* | 8/2016 | Huang ............... | G06K 7/10366 |

FOREIGN PATENT DOCUMENTS

| | | |
|---|---|---|
| CN | 101950998 | 1/2011 |
| CN | 101951693 | 1/2011 |
| CN | 102624929 | 8/2012 |
| CN | 102802134 | 11/2012 |
| CN | 102957596 | 3/2013 |
| CN | 102960006 | 3/2013 |
| CN | 103888994 | 6/2014 |
| CN | 102665227 | 3/2015 |
| JP | 2004222457 | 8/2004 |
| JP | 2007081933 | 3/2007 |
| JP | 2012175158 | 9/2012 |
| JP | 2013150028 | 8/2013 |
| JP | 2014064121 | 4/2014 |
| JP | 2014158111 | 8/2014 |
| JP | 2014212696 | 11/2014 |

OTHER PUBLICATIONS

"Office Action of Taiwan Counterpart Application," dated Sep. 8, 2017, p. 1-p. 7, in which the listed references were cited.
"Office Action of Japan Counterpart Application", dated Feb. 6, 2018, p. 1-p. 8, in which the listed references were cited.
"Office Action of China Counterpart Application" , dated Dec. 5, 2018, p. 1-p. 12.
"Office Action of China Counterpart Application," dated May 5, 2019, p. 1-p. 14.

* cited by examiner

FAIL RECOVERY METHOD AND INTERNET OF THINGS SYSTEM AND CHARGING SYSTEM USING THE SAME

CROSS-REFERENCE TO RELATED APPLICATION

This application claims the priority benefits of U.S. provisional application Ser. No. 62/210,421, filed on Aug. 26, 2015 and Taiwan application serial no. 105122779, filed on Jul. 19, 2016. The entirety of each of the above-mentioned patent applications is hereby incorporated by reference herein and made a part of this specification.

BACKGROUND OF THE INVENTION

1. Field of the Invention

The invention relates to a wireless communication technique, and more particularly, to a fail recovery method and an Internet of Things system and a charging system using the same.

2. Description of Related Art

The concept of Internet of Things (IoT) was first proposed in year 1999. The concept mentioned an approach of connecting to the Internet in a wireless manner with use of radio frequency identification (RFID), infrared ray, global positioning system (GPS), laser scan and other information sensing devices. Information may be exchanged, communicated, smartly verified, positioned, tracked, monitored and managed to further extend the reach of obtaining and managing information to perception layer thereby achieving a broader interoperability.

IoT devices from various manufacturers may use different interfaces for connection and may adopt different protocols for communication. Therefore, a gateway device is usually required in an IoT system as a mechanism for controlling and conversion between the protocols so the IoT devices with different specifications can communicate with each other.

As such, it can be known that the gateway device plays an important role in the IoT system. In the business environment that operates 24 hours a day, 7 days a week, once the gateway device is failed, the IoT devices are unable to communicate with each other or be controlled, resulting in service interruption on the entire business, which may lead to a great loss in terms of business operation. Accordingly, it has become very important as how to develop a fault tolerance mechanism so the gateway device can recover from a failure rapidly in order to provide service continuously without being interrupted.

SUMMARY OF THE INVENTION

The invention is directed to a fail recovery method and an IoT system and a charging system using the same, which are capable of solving the problem mentioned in Description of Related Art.

The fail recovery method of the IoT system of the invention includes following steps: providing a plurality of gateway devices, in which at least one of the gateway devices preset to provide a wireless network service to at least one IoT device and at least another one of the gateway devices preset to provide the wireless network service to at least one user device; mutual confirming an operation state of the other one of the gateway devices by the gateway devices; and when the one of the gateway devices is determined as failed, using the another one of the gateway devices to replace the failed gateway device, so as to simultaneously provide the wireless network service to the IoT device and the user device by the another one of the gateway devices.

The IoT system of the invention includes a plurality of gateway devices. At least one of the gateway devices preset to provide a wireless network service to at least one IoT device and at least another one of the gateway devices preset to provide the wireless network service to at least one user device. The gateway devices mutual confirm an operation state of the other one of gateway devices. When the one of the gateway devices is determined as failed, the another one of the gateway devices replaces the failed gateway device to simultaneously provide the wireless network service to the IoT device and the user device.

The charging system based on IoT of the invention includes at least one charging device, a plurality of gateway devices and a data center. The charging device is adapted to charge at least one user device, At least one of the gateway devices preset to provide a wireless network service to the charging device, and at least another one of the gateway devices preset to provide the wireless network service to the user device. The data center is adapted to communicate with the gateway devices, and configured to store data messages of the charging device and the user device. The gateway devices mutual confirm an operation state of the other one of gateway devices. When one of the gateway devices is determined as failed, another one of the gateway devices replaces the failed gateway device to simultaneously provide the wireless network service to the charging device and the user device.

Based on the above, the fail recovery method and the IoT system and the charging system using the same are proposed according to the embodiments of the invention. The IoT system can preset to provide different gateway devices for the IoT device and the user device. The gateway devices can mutual confirm the operating state of the other one of gateway devices, and when one of the gateway devices is failed, use the non-failed gateway device to replace the failed gateway device. As a result, the IoT system can recover rapidly from the failed operation state, such that the entire IoT system can provide high availability. In addition, the charging system with high availability may also be constructed based on the concept of aforesaid IoT system according to the embodiments of the invention.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
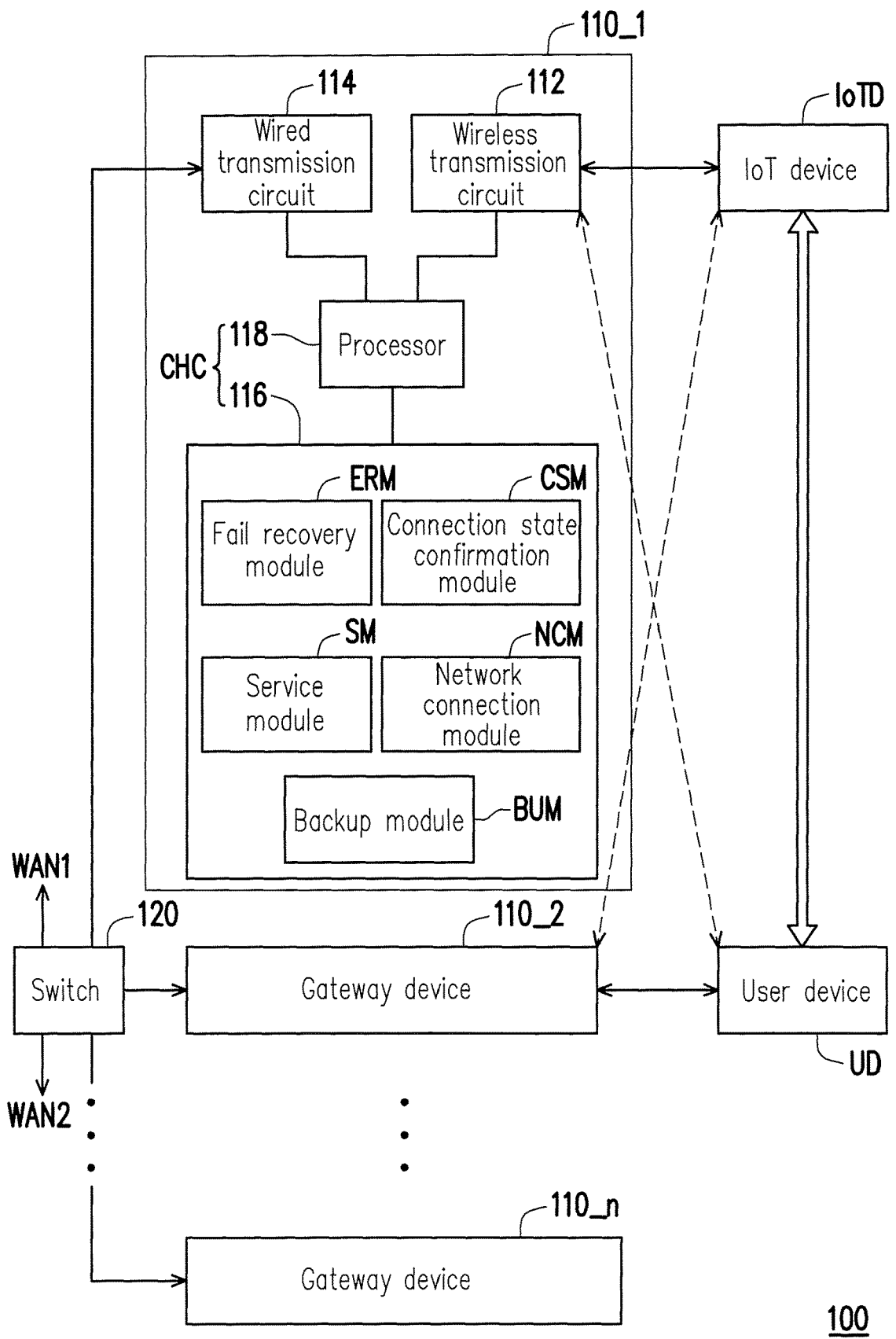
FIG. 1 is a schematic diagram of an IoT system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In order to make content of the present disclosure more comprehensible, embodiments are described below as the examples to prove that the present disclosure can actually be realized. Moreover, elements/components/steps with same reference numerals represent same or similar parts in the drawings and embodiments.

FIG. 1 is a schematic diagram of an IoT system according to an embodiment of the invention. Referring to FIG. 1, an IoT system 100 of the present embodiment includes a plurality of gateway devices 110_1 to 110_n, where n is a positive integer greater than or equal to 2.

Among the gateway devices 110_1 to 110_n, at least one gateway device (the gateway device 110_1 is taken here as the example of that) is preset to provide a wireless network service to an IoT device IoTD so the IoT device IoTD can transmit respective operation information and data back to a data center (not illustrated) at front end through the gateway device 110_1, and a system administrator can also control operation behaviors of the corresponding IoT device IoTD through the gateway device 110_1.

On the other hand, among the gateway devices 110_1 to 110_n, in addition to the gateway device 110_1 preset to provide the wireless network service, at least one gateway device (the gateway device 110_2 is taken here as the example of that) is further included and preset to provide the wireless network service to a user device UD so the user device UD is capable of connecting to the Internet through the gateway device 110_2. In the application of IoT, the IoT device IoTD may be implemented by selectively using stationary home appliances such as charging station, air conditioning, refrigerator, TV, refrigerator and so on, depending on the overall system requirements. The user device UD may be implemented by using general mobile electronic equipments provided for the user to operate, such as vehicle or cell phone. However, the invention is not limited to aforesaid examples.

In the present exemplary embodiment, each of the gateway devices 110_1 to 110_n includes a wireless transmission circuit, a wired transmission circuit and a core hardware circuit. Taking the gateway device 110_1 for example, it includes a wireless transmission circuit 112, a wired transmission circuit 114 and a core hardware circuit. CHC. Among them, the core hardware circuit CHC includes hardware parts such as a memory circuit 116 and a processing unit 118. The wireless transmission circuit 112 is coupled to the processing unit 118, and adapted to connect the user device UD and the IoT device IoTD nearby in a wireless manner. The wireless transmission circuit 112 may be implemented by using a wireless transceiver or a wireless network card, and the wireless transceiver or the wireless network card is compatible with a wireless communication protocol such as wireless fidelity protocol (Wi-Fi protocol).

The wired transmission circuit 114 is coupled to the processing unit 118, and adapted to connect other gateway devices 110_2 to 110_n in a wired manner. The wired transmission circuit 114 is compatible with a wired network protocol such as Ethernet, fast Ethernet (100BASE-T) and gigabit Ethernet, but the invention is not limited to the above.

The memory circuit 116 is coupled to the processing unit 118, and may be composed of a random access memory (RAM), a read only memory (ROM), a cache memory and components similar to the above or a combination of the above. In the present exemplary embodiment, the memory circuit 116 is configured to store a plurality of modules, and these modules may be stored in form of programs or applications in the memory circuit 116 to provide different functions.

The processing unit 118 is a hardware having a computing capability and capable of controlling operations of the gateway device 110_1 (e.g., a chip set, a processor, etc.). In the present exemplary embodiment, the processing unit 118 may be a central processing unit (CPU) or any programmable microprocessor or digital signal processor (DSP), a programmed controller, an application specific integrated circuits (ASIC), a programmable logic device (PLD) or similar devices. The processing unit 118 can access the modules stored in the memory circuit 116 and execute the functions of these modules.

In addition, in an exemplary embodiment, the gateway devices 110_1 to 110_n of the present embodiment may further preset to connect one another through a switch 120. In other words, the wired transmission circuit 114 of each of the gateway devices 110_1 to 110_n may exchange packets and data through the switch 120. However, the invention is not limited thereto.

Specifically, the modules stored in the memory circuit 116 of the gateway device 110_1 includes a fail recovery module ERM, a connection state confirmation module CSM, a service module SM, a network connection module NCM and a backup module BUM.

The fail recovery module ERM is configured to take over a service providing target of the failed one of the gateway device 110_1 to 110_n when one of the gateway devices 110_1 to 110_n is determined as failed. The connection state confirmation module CSM is configured to exchange a confirmation packet with the other gateway devices 110_1 to 110_n so as to confirm operation states of itself and the other gateway devices 110_1 to 110_n. The service module SM is configured to enable or disable a corresponding service function according to the current service providing target. The network connection module NCM is configured to periodically send a connection state confirmation packet via a network line WAN1/WAN2 in use, and confirm whether the network line WAN1/WAN2 in use is normally connected by determining whether a connection state confirmation response is received. The backup module BUM is configured to synchronize a set monitoring parameter to another one of the gateway devices 110_1 to 110_n or upload the monitoring parameter to a cloud server. As such, when one of the gateway devices 110_1 to 110_n is failed, the rest of the gateway devices 110_1 to 110_n can successfully take over the service function of the failed one of the gateway devices 110_1 to 110_n according to the monitoring parameter of the failed one of the gateway devices 110_1 to 110_n.

In terms of the overall system operation, the user device UD may be connected to the data center of the IoT system 100 via a wireless network service provided by the corresponding gateway device 110_2. After several settings are completed (e.g., necessary information is inputted and a desired service is selected by the user, etc.), the data center can enable the IoT device IoTD through the gateway device 110_1 to interact with the user device UD. Among them, during the interaction of the IoT device IoTD and the user device UD, the IoT device IoTD may also transmit information and data in the interaction back to the data center through the wireless network service provided by the gateway device 110_1 so the system administrator can perform optimization, analysis or other necessary measures according to the collected information.

Figure 2:
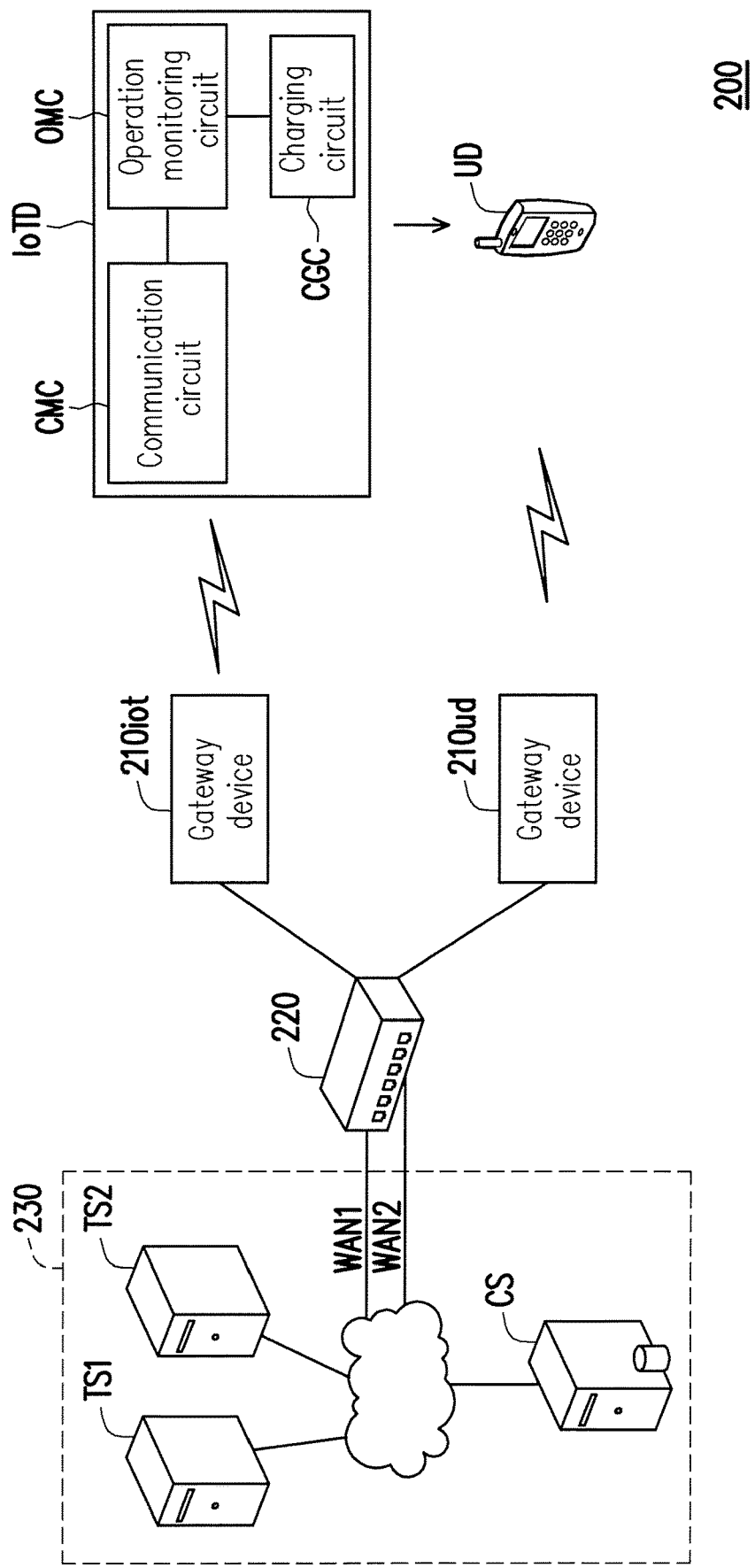
FIG. 2 is a schematic diagram of a charging system based on IoT according to an embodiment of the invention.

In a specific application example, the IoT system 100 may be, for example, a charging system based on IoT, as shown in FIG. 2. A charging system 200 of the present embodiment includes a charging device IoTD (i.e., the IoT device in the foregoing embodiment), a gateway device 210$iot$ preset to provide the wireless network service to the charging device IoTD, a gateway device 210$ud$ preset to provide the wireless network service to the user device UD, a switch 220 and a data center 230.

The charging device IoTD includes a charging circuit CGC, an operation monitoring circuit OMC and a communication circuit CMC. Among them, the charging circuit CGC is configured to charge the user device UD. The operation monitoring circuit OMC is configured to collect charging data while charging the user device UD. The communication circuit CMC is configured to communicate with the corresponding gateway device 210$iot$, so as to transmit the collected charging data back to the corresponding gateway device 210$iot$, and then transmit the collected charging data back to the data center 230 through the gate device 210$iot$.

The switch 220 connects the wired transmission circuits of the gateway devices 210$iot$ and 210$ud$, where the switch 220 has a plurality of network lines (although only two network lines WAN1 and WAN2 are illustrated in the present embodiment as an example, the invention is not limited thereto). The switch 220 uses one of the network lines WAN1 and WAN2 to provide an internet service to the gateway devices 210$iot$ and 210$ud$. Among them, the network line WAN1/WAN2 not in use is equivalent to a backup line for the network line WAN1/WAN2 in use, and the switch 220 can automatically switch to use the backup line to provide the internet service instead when the network line WAN1/WAN2 in use is determined as disconnected.

The data center 230 is adapted to communicate with the gateway devices 210$iot$ and 210$ud$, and configured to store and process data messages of the charging device IoTD and the user device UD. Among them, the data center 230 may include, for example, two different target servers TS1 and TS2 and a cloud server CS. Under preset settings, the user device UD may be connected to the data center 230 through the gateway device 210$ud$ to request for enabling a charging function of the charging device IoTD or inquiring for information such as a charged state. Further, the data center 230 can give a control command to the charging device IoTD through the gateway device 210$iot$. In embodiments of the invention, the target servers TS1 and TS1 may be inside the data center, such as 230, or any ICMP server in the internet.

Under the architecture of the charging system 200 of the present embodiment, the user may connected to the data center 230 through the gateway device 210$ud$ and the switch 220, and download an application required for using the charging device IoTD or register related information for enabling the charging function of the charging device IoTD. After the settings are completed, the data center 230 may then control the charging device IoTD through the gateway device 210$iot$ and the switch 220 to start charging the user device UD. During the charging process, the charging device IoTD may also transmit charging information back to the data center 230 for storage through the gateway device 210$iot$ and the switch 220.

Specifically, in the traditional architecture of the IoT system, the same gateway device is usually applied to provide the wireless network service to the IoT device and the user device. Once the gateway device is failed, the IoT system can no longer operate.

In contrast, the multiple gateway devices 110_1 and 110_2/210$iot$ and 210$ud$ are disposed in the IoT system 100 or the charging system 200 of the present embodiment. As such, the gateway devices 110_1 and 110_2/210$iot$ and 210$ud$ of the present embodiment can realize an automated fail recovery by applying the steps in the flowchart of FIG. 3. Accordingly, when one of the gateway devices is failed, a non-failed gateway device may be switched to simultaneously provide the wireless network service to the user device UD and the IoT device IoTD so the entire IoT system 100 can provide high availability.

Figure 3:
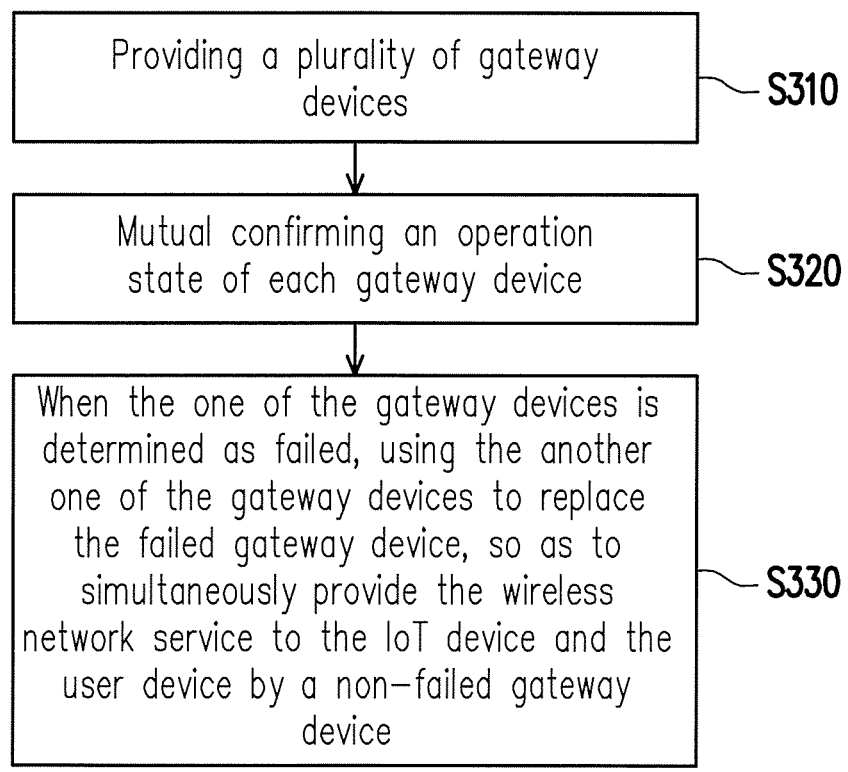
FIG. 3 is a flowchart of steps in a fail recovery method of the IoT system according to an embodiment of the invention.

The method illustrated in FIG. 3 is performed by the modules stored in the corresponding memory circuit 116 accessed and executed by the gateway device. FIG. 3 is a flowchart of steps in a fail recovery method of the IoT system according to an embodiment of the invention.

Here, the related description is provided below using the architecture of FIG. 1 together with the method of FIG. 3. Referring to FIG. 1 and FIG. 3 together, first of all, the multiple gateway devices 110_1 to 110_n are provided in the IoT system 100, in which the gateway devices 110_1 and 110_2 are preset to provide the wireless network service to the IoT device IoTD and the user device UD, respectively (step S310).

Under such architecture, the IoT system 100 can use the gateway devices 110_1 and 110_2 to mutual confirm an operation state of the other one (step S320). When one of the gateway devices 110_1 and 110_2 is determined as failed, another one of the gateway devices 110_1 and 110_2 is used to replace the failed gateway device, so as to simultaneously provide the wireless network service to the IoT device IoTD and the user device UD by the non-failed gateway device (step S330).

Figure 4:
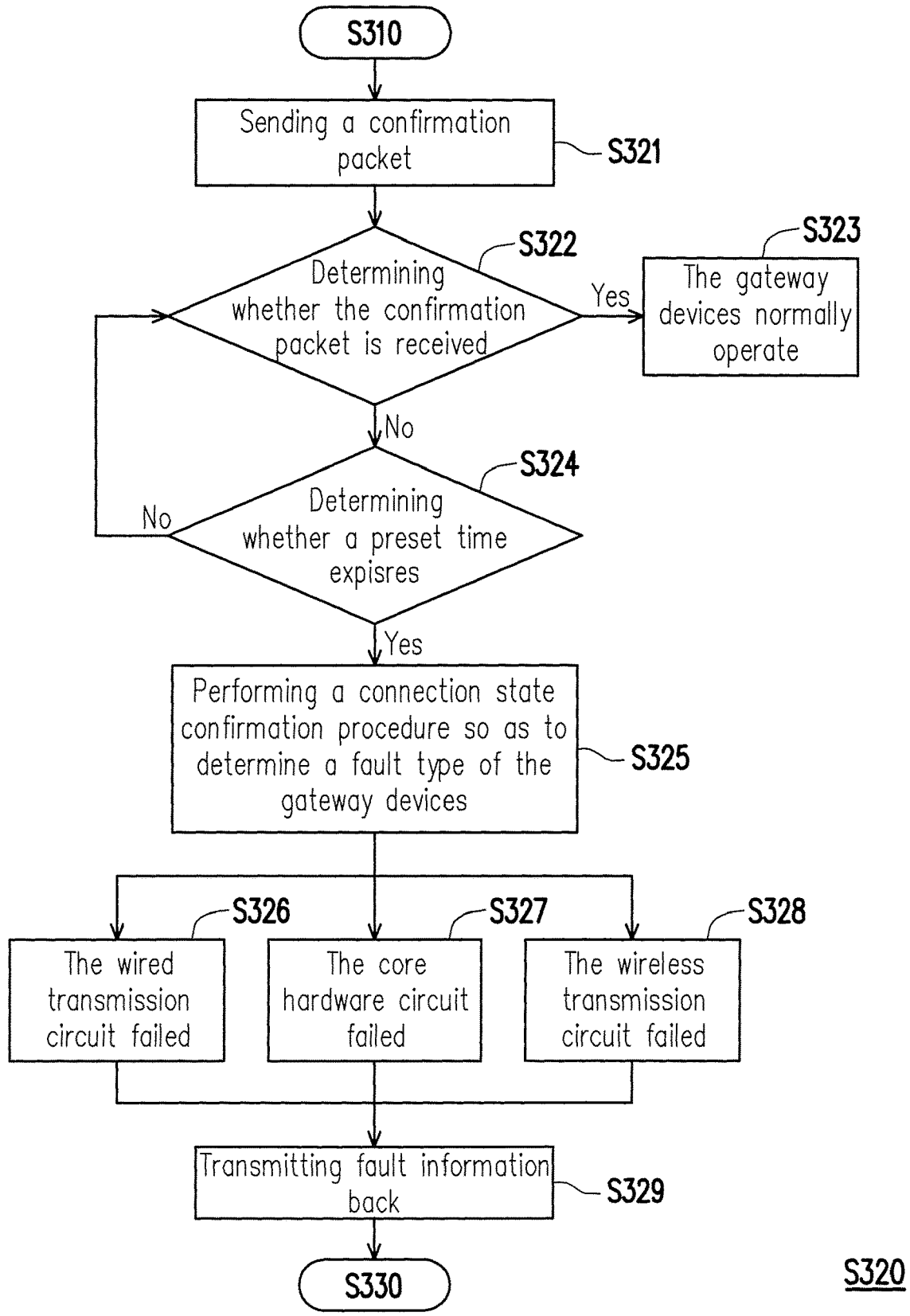
FIG. 4 is a flowchart of steps for confirming an operation state and a fault type of the gateway device according to an embodiment of the invention.

More specifically, specific steps for confirming the operation states of the gateway devices 110_1 and 110_2 are as illustrated in FIG. 4. FIG. 4 is a flowchart of steps for confirming an operation state and a fault type of the gateway device according to an embodiment of the invention.

Referring to FIG. 1 to FIG. 4 together, description herein is provided below with the gateway device 110_1 taken as the main part. In step S320, the processing unit 118 first execute the connection state confirmation module CSM to make the wired transmission circuit 114 sending a confirmation packet to the gateway device 110_2 (step S321) and determining whether the confirmation packet sent by the gateway device 110_2 is received (step S322). Here, said confirmation packet may be, for example, a heartbeat packet containing a host state.

If the processing unit 118 determines that the confirmation packet sent by the gateway device 110_2 is received and the operation state of the gateway device 110_2 indicated in the confirmation packet is normal, it is then determined that the two gateway devices 110_1 and 110_2 both operate normally (step S323).

If the processing unit 118 determines that the confirmation packet sent by the gateway device 110_2 is not received, whether a time within which the confirmation packet is not received exceeds a preset time (step S324). If the preset time is not exceeded, the processing unit 118 continues to determine whether the confirmation packet is received; otherwise, if the confirmation packet is still not received when the preset time expires, the processing unit 118 performs a connection state confirmation procedure so as to determine a fault type of the gateway devices 110_1 and 110_2 (step S325).

After the connection state confirmation procedure is performed, the processing unit 118 can determine whether the fault type of the gateway devices 110_1 and 110_2 belongs to the wired transmission circuit 114 failed (step S326), the core hardware circuit CHC failed (step S327) or the wireless transmission circuit 112 failed (step S328). Accordingly, the processing unit 118 may transmit the detected fault information back to the data center (step S329), and then execute the fail recovery module ERM and the service module SM to make the non-failed gateway device 110_1/110_2 replacing the functions of the failed gateway device 110_1/110_2 (step S330).

Figure 5:
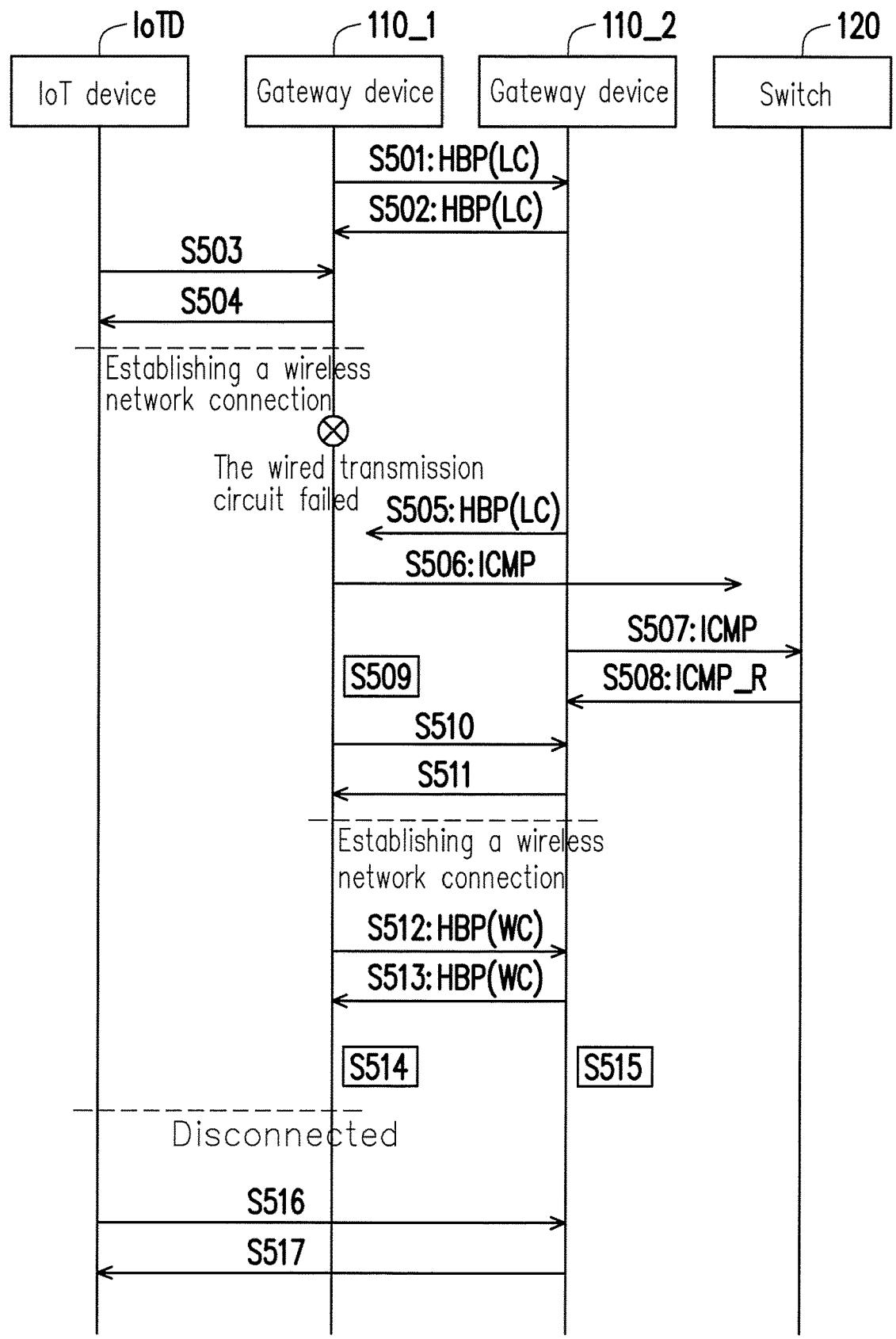
FIG. 5 is a schematic diagram of a fail recovery flow taken when the wired transmission circuit of the gateway device is failed according to an embodiment of the invention.
Figure 6:
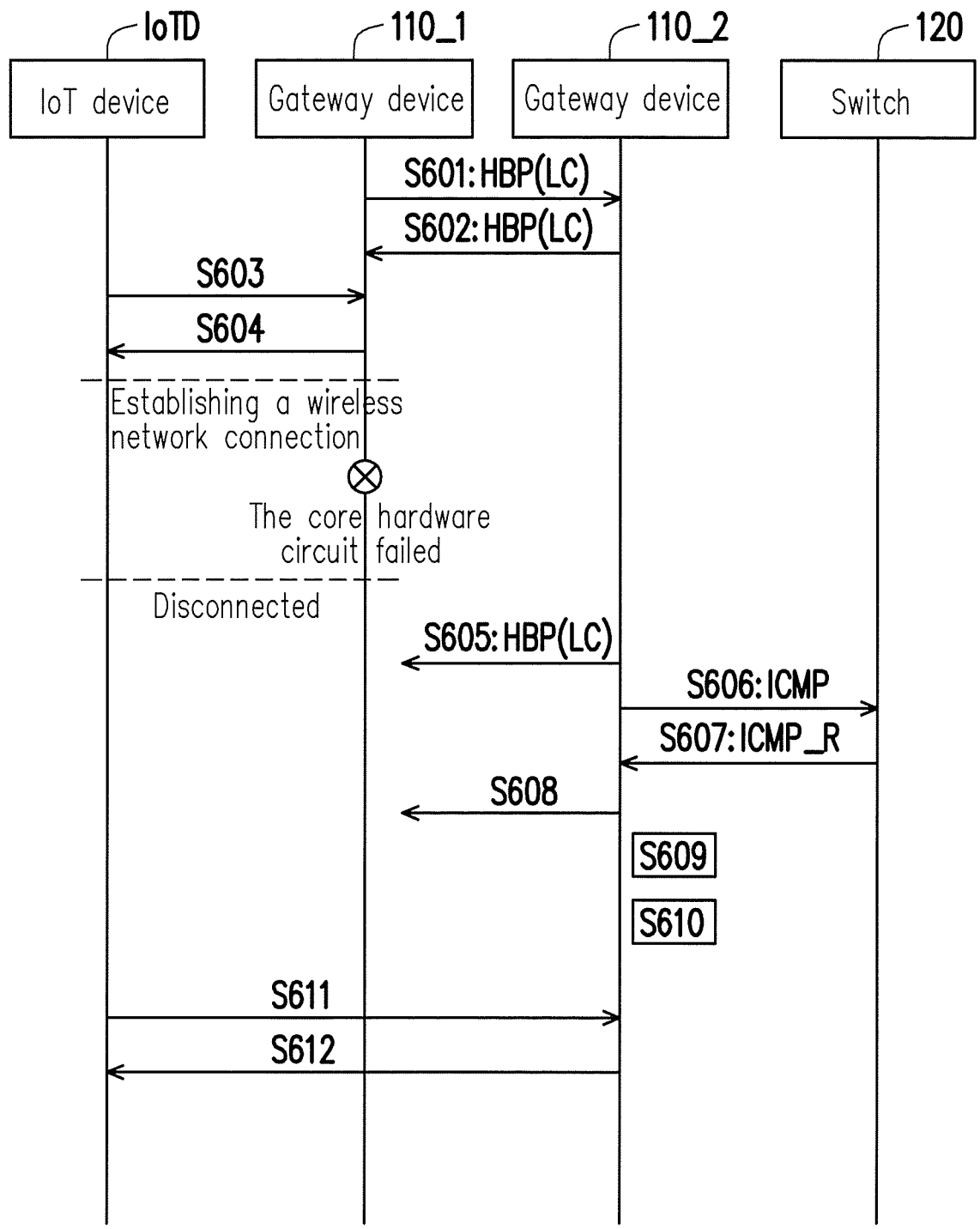
FIG. 6 is a schematic diagram of a fail recovery flow taken when the core hardware circuit of the gateway device is failed according to an embodiment of the invention.
Figure 7:
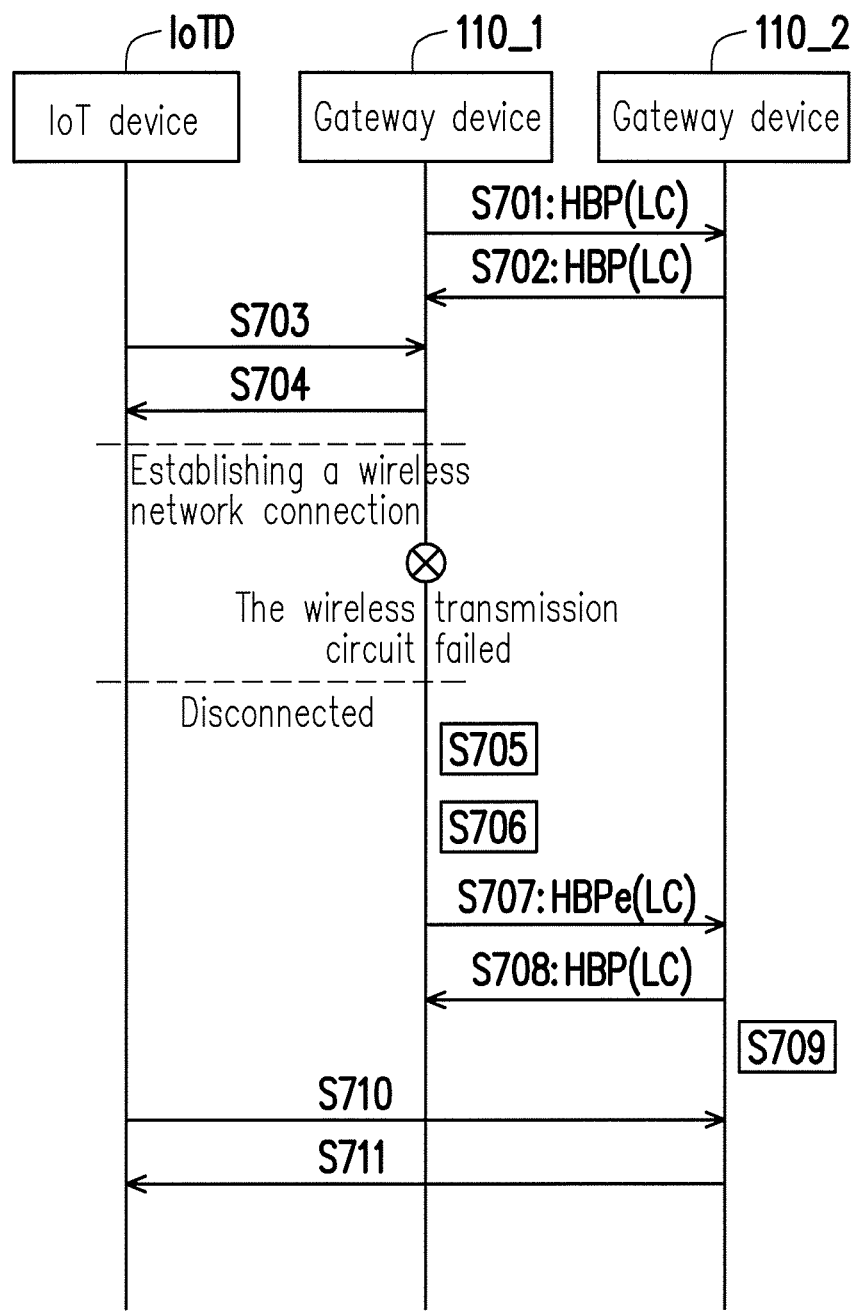
FIG. 7 is a schematic diagram of a fail recovery flow taken when the wireless transmission circuit of the gateway device is failed according to an embodiment of the invention.
Figure 8:
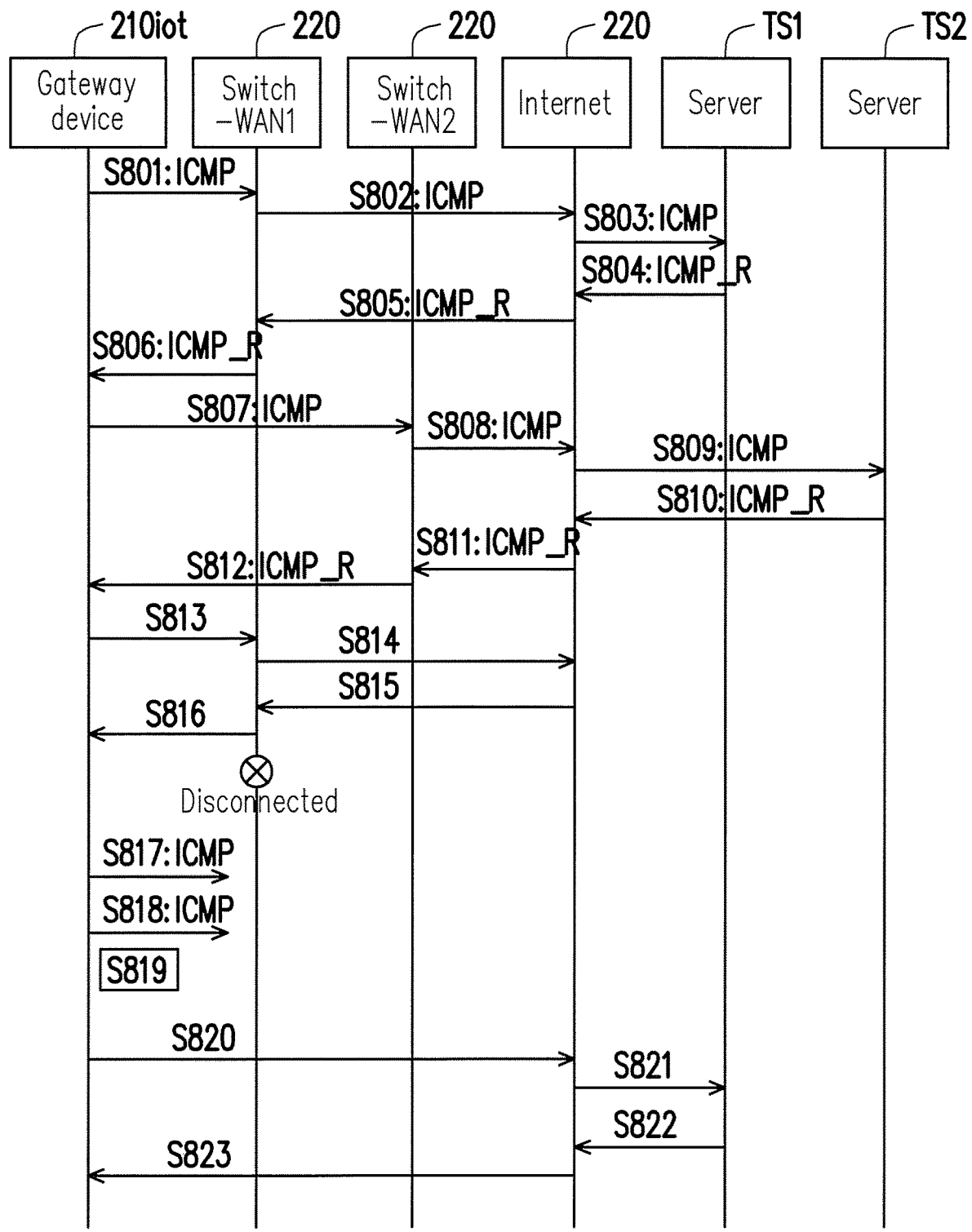
FIG. 8 is a schematic diagram of a fail recovery flow taken when the network line of the switch is disconnected according to an embodiment of the invention.

Interactions between the IoT device IoT and the gateway devices 110_1 and 110_2 are used as an example for describing the fail recovery method and specific steps in the connection state confirmation procedure according to the present embodiment. FIG. 5, FIG. 6 and FIG. 7 illustrate the fail recovery flows of the gateway device 110_1 when the wired transmission circuit 114 failed, the core hardware circuit CHC failed and the wireless transmission circuit 112 failed, respectively. Further, FIG. 8 illustrates a fail recovery flow taken when the network line WAN1 of the switch 120 is disconnected.

Person with ordinary skill in the art should be able to understand how to realize similar fail recovery method between the user device UD and the gateway devices 110_1 and 110_2 based on the following description, and thus interactions between other user devices UD and the gateway device 110_2 is not repeated hereinafter.

FIG. 5 is a schematic diagram of a fail recovery flow taken when the wired transmission circuit of the gateway device is failed according to an embodiment of the invention. Referring to FIG. 1 and FIG. 5 together, in the case where both the gateway devices 110_1 and 110_2 operate normally, the gateway device 110_1 regularly sends a confirmation packet HBP to the gateway device 110_2 (step S501). When the confirmation packet HBP sent by the gateway device 110_1 is received by the gateway device 110_2, the gateway device 110_2 records the state of the gateway device 110_1 according to a content of the confirmation packet HBP.

Similarly, the gateway device 110_2 also regularly sends the confirmation packet HBP to the gateway device 110_1 (step S502). When the confirmation packet HBP sent by the gateway device 110_2 is received by the gateway device 110_1, the gateway device 110_1 records the state of the gateway device 110_2 according to a content of the confirmation packet HBP. Since it is preset to exchange the confirmation packet HBP between the gateway devices 110_1 and 110_2 by using the wired transmission circuit 114, "LC" (a wired network connection) is annotated after the confirmation packet HBP hereinafter.

At this point, because the gateway devices 110_1 and 110_2 confirm that both sides are in the state of normally operating, the IoT device IoTD can send a connection request to the gateway device 110_1 preset to provide the service (step S503). After confirming that the connection request may be authorized, the gateway device 110_1 transmits a connection confirmation response back to the IoT device IoTD through the wireless transmission circuit 112 (step S504), and establishes a wireless network connection with the IoT device IoTD.

It is assumed that, after the wireless network connection is successfully established, the wired transmission circuit 114 of the gateway device 110_1 is failed (e.g., the network is failed). In this case, the gateway device 110_1 is unable to send the confirmation packet HBP to the gateway device 110_2 through the wired transmission circuit 114. Also, when the gateway device 110_2 sends the confirmation packet HBP to the gateway device 110_1 through the wired transmission circuit 114 (step S505), the gateway device 110_1 is also unable to receive the confirmation packet HBP sent from the gateway device 110_2.

Under such circumstance, after determining that the confirmation packet sent HBP from the other one of the gateway devices 110_1 and 110_2 is still not received after the preset time expires, each of the gateway devices 110_1 and 110_2 sends a connection state confirmation packet ICMP to a wired network gateway in the switch 120 (steps S506 and S507), so as to confirm whether the operation state of the respective wired transmission circuit 114 is normal.

Because the gateway device 110_2, which is not failed at the time, is able to receive a connection state confirmation response ICMP_R transmitted back from the wired network gateway in the switch 120 and determine that the respective wired transmission circuit 114 operates normally. On the other hand, since the wired transmission circuit 114 is failed, the gateway device 110_1 cannot receive the connection state confirmation response ICMP_R transmitted back from the wired network gateway in the switch 120. After the preset time expires, the gateway device 110_1 determines the respective wired transmission circuit 114 as failed (step S509).

After the respective transmission circuit 114 is determined as failed, the gateway device 110_1 enables a station mode of the wireless transmission circuit 112 so as to attempt establishing a connection with the gateway device 110_2 via a wireless network (step S510). After receiving the connection request, the gateway device 110_2 establishes the wireless network connection between the gateway devices 110_1 and 110_2 in response to the connection request for the wireless network from the gateway device 110_1 (step S511). The gateway device 110_2 also enables the station mode of the wireless transmission circuit 112 so as to attempt establishing a connection with the gateway device 110_1 via the wireless network. After receiving the connection request, the gateway device 110_1 establishes the wireless network connection between the gateway devices 110_1 and 110_2 in response to the connection request for the wireless network from the gateway device 110_2.

After the wireless network connection between the gateway devices 110_1 and 110_2 is established, the gateway device 110_1 sends the confirmation packet HBP to the gateway device 110_2 via a wireless network connection WC instead (step S512). After receiving the confirmation packet HBP, the gateway device 110_2 records the state of the gateway device 110_1 and learned that the wired transmission circuit 114 of the gateway device 110_1 is failed. Similarly, the gateway device 110_2 sends the confirmation packet HBP to the gateway device 110_1 via the wireless network connection WC instead (step S513). After receiving the confirmation packet HBP, the gateway device 110_1 records the state of the gateway device 110_2 and learned that the gateway device 110_2 operates normally.

At this time, each of the gateway devices 110_1 and 110_2 has learned the operation state of the other one of the gateway devices 110_1 and 110_2. Because the gateway device 110_1 is failed, the gateway device 110_1 disables the respective wireless network (step S514) so the wireless network connection between the IoT device IoTD and the gateway device 110_1 is disconnected. Meanwhile, the gateway device 110_2 incorporates the service of the gateway device 110_1 to be provided to the IoT device IoTD while continuously executing the service to be provided to the user device UD (step S515). In other words, the gateway device 110_2 enables a corresponding service function according to a service providing target (the IoT device IoTD) of the failed gateway device 110_1.

Thereafter, the IoT device IoTD attempts establishing the wireless network connection with the gateway device 110_2 instead (step S516), and the gateway device 110_2 controls the IoT device IoTD instead after the connection request of the IoT device IoTD is confirmed by the gateway device 110_2 (step S517).

FIG. 6 is a schematic diagram of a fail recovery flow taken when the core hardware circuit of the gateway device is failed according to an embodiment of the invention. Next, referring to FIG. 1 and FIG. 6 together, in the case where both the gateway devices 110_1 and 110_2 operate normally, the gateway device 110_1 regularly sends the confirmation packet HBP to the gateway device 110_2 via a wired network LC (step S601). When the confirmation packet HBP sent by the gateway device 110_1 is received by the gateway device 110_2, the gateway device 110_2 records the state of the gateway device 110_1 according to a content of the confirmation packet HBP.

Similarly, the gateway device 110_2 also regularly sends the confirmation packet HBP to the gateway device 110_1 via the wired network LC (step S602). When the confirmation packet HBP sent by the gateway device 110_2 is received by the gateway device 110_1, the gateway device 110_1 records the state of the gateway device 110_2 according to a content of the confirmation packet HBP.

At this point, the gateway devices 110_1 and 110_2 confirm that both sides are at the state of normally operating, so the IoT device IoTD can send a connection request to the gateway device 110_1 preset to provide the service (step S603). After confirming that the connection request may be authorized, the gateway device 110_1 transmits a connection confirmation response back to the IoT device IoTD through the wireless transmission circuit 112 (step S604), and establishes the wireless network connection with the IoT device IoTD.

It is assumed that, after the wireless network connection is successfully established, the core hardware circuit CHC of the gateway device 110_1 is failed. At the time, neither the wired transmission circuit 114 nor the wireless transmission circuit 112 of the gateway device 110_1 can operate normally.

Under such circumstance, the gateway device 110_2 still sends the confirmation packet HBP via the wired network LC (step S605), and after determining that the confirmation packet HBP sent from the gateway device 110_1 is still not received after the preset time expires, sends the connection state confirmation packet ICMP to the wired network gateway in the switch 120 (steps S606), so as to confirm whether the operation state of the respective wired transmission circuit 114 is normal.

When the connection state confirmation response ICMP_R transmitted back from the switch 120 is received by the gateway device 110_2 (step S607), the gateway device 110_2 can then determine the respective wired transmission circuit 114 operates normally. In this case, the gateway device 110_2 enables the station mode of the wireless transmission circuit 112 so as to attempt establishing a connection with the gateway device 110_2 via the wireless network in order to send the confirmation packet HBP to the gateway device 110_1 via the wireless network (step S608).

Nonetheless, since the gateway device 110_1 is already failed and unable to transmit back the confirmation packet HBP, the gateway device 110_2 can determine the core hardware circuit CHC of the gateway device 110_1 as failed after the preset time expires (step S609). Meanwhile, the gateway device 110_2 incorporates the service of the gateway device 110_1 to be provided to the IoT device IoTD while continuously executing the service to be provided to the user device UD (step S610). In other words, the gateway device 110_2 enables a corresponding service function according to a service providing target (the IoT device IoTD) of the failed gateway device 110_1.

Thereafter, the IoT device IoTD attempts establishing the wireless network connection with the gateway device 110_2 instead (step S611), and the gateway device 110_2 controls the IoT device IoTD instead after the connection request of the IoT device IoTD is confirmed by the gateway device 110_2 (step S612).

FIG. 7 is a schematic diagram of a fail recovery flow taken when the wireless transmission circuit of the gateway device is failed according to an embodiment of the invention. Next, referring to FIG. 1 and FIG. 7 together, in the case where both the gateway devices 110_1 and 110_2 operate normally, operations of the gateway devices 110_1 and 110_2 (steps S701 to S704) are substantially identical to steps S501 to S504 and S601 to S604 in the foregoing embodiments, which are not repeated hereinafter.

It is assumed herein that, after the wireless network connection is successfully established, the wireless transmission circuit 112 of the gateway device 110_1 is failed (e.g., the wireless network card is failed). In this case, the wireless network connection between the gateway device 110_1 and the IoT device IoTD is disconnected, but transmission between the gateway devices 110_1 and 110_2 can still be conducted via a wired network.

In the present embodiment, the operation state of the respective wireless transmission circuit 112 is constantly checked during the operations of the gateway devices 110_1 and 110_2. Therefore, when the wireless transmission circuit 112 of the gateway device 110 is failed, the gateway device 110_1 can determine the respective wireless transmission circuit 112 as failed in real time according to a detecting result of the operation state (step S705).

When the gateway device 110_1 determines the respective wireless transmission circuit as failed, the gateway device 110_1 adds an error code to the sent confirmation packet indicating that the wireless transmission circuit 112 is failed (step S706), and transmits the confirmation packet HBPe added with the error code to the gateway device 110_2 via the wired network LC (step S707). On the other hand, because the gateway device 110_2 operates normally, the gateway device 110_2 sends the normal confirmation packet HBP to the gateway device 110_1 (step S708).

When the confirmation packet HBPe added with the error code is received by the gateway device 110_2, the gateway device 110_2 can determine the wireless transmission circuit 112 of the gateway device 110_1 as failed according to the error code (step S709). In this case, the gateway device 110_2 incorporates the service of the gateway device 110_1 to be provided to the IoT device IoTD while continuously executing the service to be provided to the user device UD (step S710). In other words, the gateway device 110_2 enables a corresponding service function according to a service providing target (the IoT device IoTD) of the failed gateway device 110_1.

Thereafter, the IoT device IoTD attempts establishing the wireless network connection with the gateway device 110_2 instead (step S710), and the gateway device 110_2 controls the IoT device IoTD instead after the connection request of the IoT device IoTD is confirmed by the gateway device 110_2 (step S711).

FIG. 8 is a schematic diagram of a fail recovery flow taken when the network line of the switch is disconnected according to an embodiment of the invention. FIG. 2 illustrates the whole network architecture, and thus the present embodiment is described together with the architecture of FIG. 2. In the present embodiment, the servers TS1 and TS2 may be, for example, a server supporting the ICMP protocol such as a domain name system (DNS) server of an internet service provider (ISP), but the invention is not limited thereto. A routing table in the switch 220 may be configured with a static route of IP addresses of the servers TS1 and TS2 so packets sent from the gateway device to the server TS1 are assigned to take the network line WAN1 while the packets sent to the server TS2 are assigned to take the network line WAN2. In the present embodiment, the IoT system/charging system 200 is preset to use the network line WAN1 for transmitting the packets.

Referring to FIG. 2 and FIG. 8 together, description herein is provided below with the gateway device 210iot taken as the main part. First of all, the gateway device 210iot regularly/periodically sends the connection state confirmation packet ICMP to the server TS1. Because of the static route is configured in the routing table of the switch 220, the packets with destination being the server TS1 are sending towards the network line WAN1. Therefore, the connection state confirmation packet ICMP is sent from the gateway device 210iot to the switch 220 (step S801), then uploaded to the Internet via the network line WAN1 (step S802), and transmitted to the server TS1 via the Internet (step S803).

After receiving the connection state confirmation packet ICMP, the sever TS1 transmit a connection state confirmation response ICMP_R back to the gateway device 210iot (steps S804 to S806) via the same path (the server TS1→the Internet→the network line WAN1→the switch→the gateway device 210iot). If the connection state confirmation response ICMP_R is received by the gateway device 210iot, the network line WAN1 may be determined as normally connected. Similarly, the gateway device 210iot may also use the similar method to detect whether the network line WAN2 is normally connected, as shown by steps S807 to S812.

After step S812, the gateway device 210iot determines that the two network lines WAN1 and WAN2 are both in a normal connected state. Therefore, the preset network line WAN1 is used to upload data to the Internet (steps S813 and S814), and the network line WAN1 is also used to download data from the Internet (steps S815 and S816).

It is assumed that the network line WAN1 in use is disconnected. In this case, after confirming that sending of the connection state confirmation packet ICMP shows consecutive failures (steps S817 and S818; two consecutive failures are taken as an example herein, but the invention is not limited thereto), the gateway device 210iot determines the network line WAN1 in use as disconnected, and switches the network line in use to WAN2 (step S819). Accordingly, the network line WAN2 is used by the gateway device 210iot to upload data to the Internet (steps S820 and S821) and download data from the Internet instead (steps S822 and S823).

Figure 9:
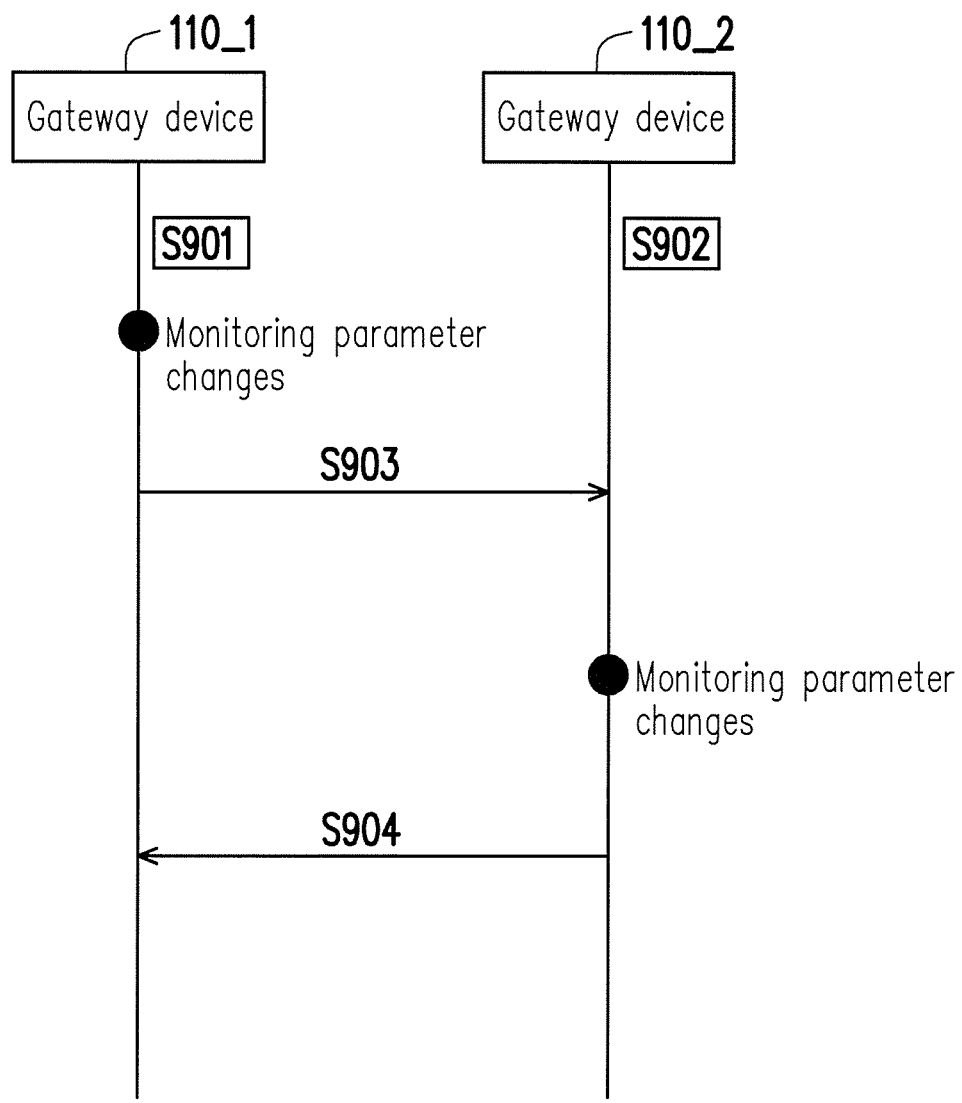
FIG. 9 is a schematic diagram of a data synchronization flow of the gateway device according to an embodiment of the invention.
Figure 10:
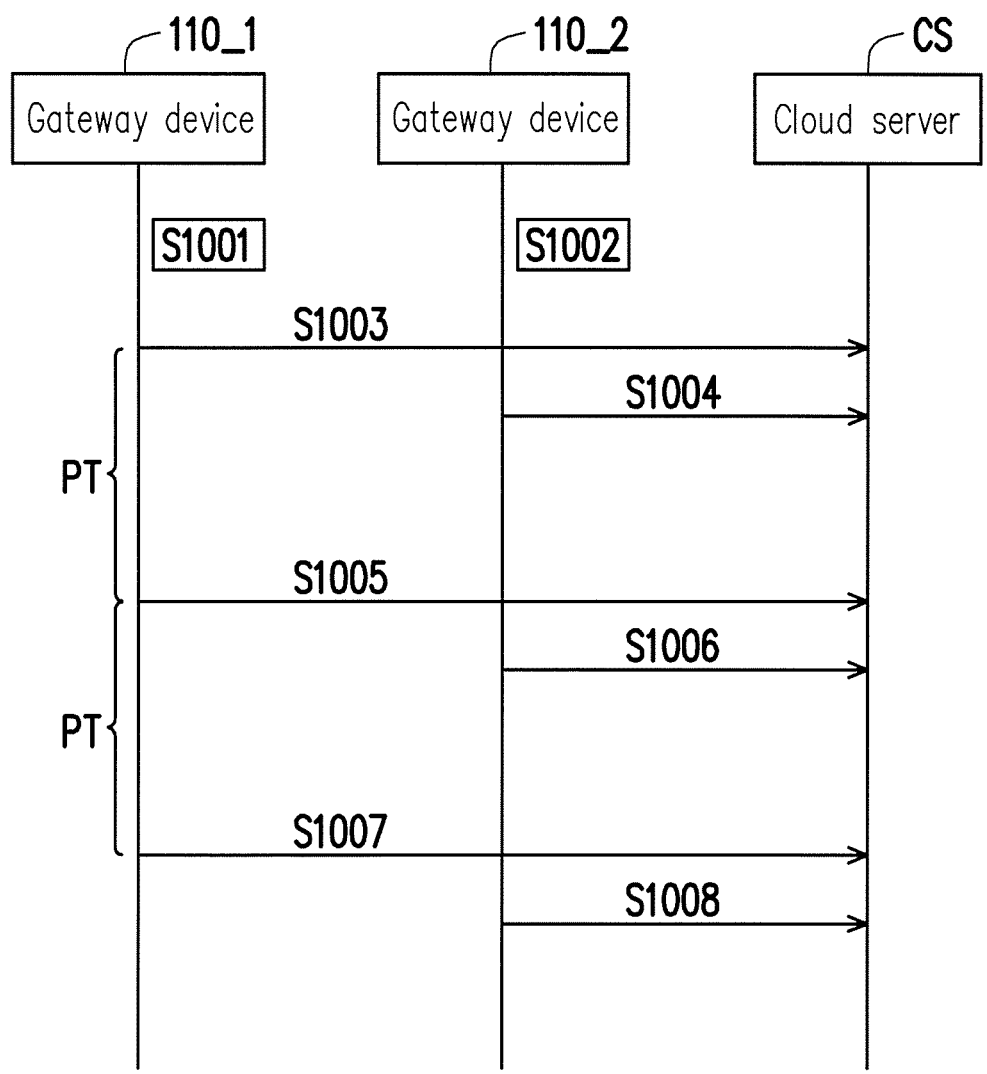
FIG. 10 is a schematic diagram of a data synchronization flow of the gateway device according to another embodiment of the invention.

Embodiments of FIG. 9 and FIG. 10 illustrate a data backup/synchronizing method of each gateway device in the IoT system according to the embodiments of the invention.

Referring to FIG. 1 and FIG. 9, in the present embodiment, each of the gateway devices 110_1 and 110_2 sets the respective monitoring parameter in advance (steps S901 and S902). The monitoring parameter may be operation state parameters or operation setup files of the IoT device IoTD and the user device UD, which are not particularly limited in the invention.

In the case where the monitoring parameter of each of the gateway devices 110_1 and 110_2 does not change, the gateway devices 110_1 and 110_2 do not perform any synchronizing action. When the monitoring parameter of the gateway device 110_1 changes, the gateway device 110_1 synchronizes the changed monitoring parameter to the gateway device 110_2 (step S903). Similarly, when the monitoring parameter of the gateway device 110_2 changes, the gateway device 110_2 also synchronizes the changed monitoring parameter to the gateway device 110_1 in real time (step S904).

Accordingly, the information obtained by the gateway devices 110_1 and 110_2 can maintain synchronized at all time. By doing so, once one of gateway device 110_1/110_2 is failed, another one of gateway devices 110_2/110_1 can immediately replace the failed gateway device 110_1/110_2.

In practical applications, the gateway devices 110_1 and 110_2 can use the Linux kernel subsystem, inotify, to realize the functions of monitoring data and configuration files as described above. For example, when a content of a monitored file changes, inotify transmits back a status code so the gateway device 110_1/110_2 can recall rsync to synchronize the changed file to another gateway device 110_1/110_2.

Next, referring to FIG. 1 and FIG. 10, in the present embodiment, each of the gateway devices 110_1 and 110_2 also sets the respective monitoring parameter in advance (steps S1001 and S1002). Unlike the embodiment of FIG. 9, the gateway devices 110_1 and 110_2 periodically upload the monitoring parameter to the cloud server CS.

Specifically, as shown in FIG. 10, each the gateway devices 110_1 and 110_2 uploads the set monitoring parameter to the cloud server CS (steps S1003 and S1004), and uploads the set monitoring parameter to cloud server CS again after waited for a fixed time interval PT (steps S1005 and S1006). Similarly, after steps S1005 and S1006, the gateway devices 110_1 and 110_2 uploads the set monitoring parameter to the cloud server CS once again after waited for the time interval PT (steps S1007 and S1008), and so on and so forth.

Accordingly, once one of gateway device 110_1/110_2 is failed, another one of gateway device 110_2/110_1 can then download the monitoring parameter of the failed gateway device 110_1/110_2 from the cloud server CS in order to replace the failed gateway device 110_1/110_2.

In summary, the fail recovery method and the IoT system and the charging system using the same are proposed according to the embodiments of the invention. The IoT system can preset to provide different gateway devices for the IoT device and the user device. The gateway devices can mutual confirm the operating state of the other one, and when one of the gateway devices is failed, use the non-failed gateway device to replace the failed gateway device. As a result, the IoT system can recover rapidly from the failed operation state, such that the entire IoT system can provide high availability. In addition, the charging system with high availability may also be constructed based on the concept of aforesaid IoT system according to the embodiments of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fail recovery method of an Internet of Things (IoT) system, comprising:
providing a plurality of gateway devices, wherein a first gateway device of the plurality of gateway devices preset to provide a wireless network service to at least one IoT device, and a second gateway device of the plurality of gateway devices preset to provide the wireless network service to at least one user device, wherein each of the gateway devices comprises a wired transmission circuit;
mutual confirming an operation state of other one of the gateway devices by the gateway devices, wherein the step of mutual confirming the operation state of the other one of the gateway devices by the gateway devices comprises:
sending a confirmation packet by the first gateway device;
determining whether the confirmation packet is received by the second gateway device within a preset time;
if the confirmation packet is received by the second gateway device within the preset time, determining the one of the gateway devices as not failed; and
if the confirmation packet is not received by the second gateway device within the preset time, performing a connection state confirmation procedure so as to determine a fault type, wherein the step of performing the connection state confirmation procedure so as to determine the fault type comprises:
sending a connection state confirmation packet by the wired transmission circuit;
determining whether a connection state confirmation response is received;
if the connection state confirmation response is received, determining the wired transmission circuit of the second gateway device as normal; and
if the connection state confirmation response is not received, determining the wired transmission circuit of the second gateway device as failed;
when the first gateway device is determined as failed, using the second gateway device to replace the first gateway device, so as to simultaneously provide the wireless network service to the IoT device and the user device by the second gateway device;
setting at least one monitoring parameter of the gateway devices; and
when the monitoring parameter of the first gateway device changes, synchronizing the changed monitoring parameter to the other gateway devices by the first gateway device.

2. The fail recovery method of the IoT system of claim 1, wherein each of the gateway devices comprises a wireless transmission circuit and a core hardware circuit, and the gateway devices preset to send the confirmation packet via a wired network established by the corresponding wired transmission circuit.

3. The fail recovery method of the IoT system of claim 2, wherein the step of performing the connection state confirmation procedure so as to determine the fault type further comprises:
when the wired transmission circuit of the second gateway device is determined as normal, sending the confirmation packet to the one of the gateway devices by the wireless transmission circuit via a wireless network instead;
determining whether the confirmation packet is received via the wireless network within the preset time;
if the confirmation packet is received via the wireless network within the preset time, determining the wired transmission circuit of the first gateway device as failed; and
if the confirmation packet is not received via the wireless network within the preset time, determining the core hardware circuit of the first gateway device as failed.

4. The fail recovery method of the IoT system of claim 2, wherein the step of mutual confirming the operation state of the other one of the gateway devices by the gateway devices further comprises:
checking the operation state of the respective wireless transmission circuit by each of the gateway devices;
when the first gateway device determines the respective wireless transmission circuit as failed, adding an error code to the sent confirmation packet; and
when the confirmation packet added with the error code is received by the second gateway device, determining the wireless transmission circuit of the first gateway device as failed.

5. The fail recovery method of the IoT system of claim 1, wherein when the first gateway device is determined as failed, the step of using the second gateway device to replace the failed gateway device, so as to simultaneously provide the wireless network service to the IoT device and the user device by the second gateway device comprises:
disconnecting a wireless network connection between the IoT device or the user device and the failed gateway device;
enabling a corresponding service function of the second gateway device according to a service providing target of the failed gateway device; and
re-establishing the wireless network connection with the IoT device or the user device by the second gateway device.

6. The fail recovery method of the IoT system of claim 1, further comprising:
providing a switch connected to the gateway devices, wherein the switch has a plurality of network lines, and the switch uses one of the network lines to provide an internet service to the gateway devices.

7. The fail recovery method of the IoT system of claim 6, further comprising:
periodically sending a connection state confirmation packet via the network line in use;
determining whether a connection state confirmation response is received;
if the connection state confirmation response is received, determining the network line in use as normally connected; and
if the connection state confirmation response is not received, determining the network line in use as disconnected.

8. The fail recovery method of the IoT system of claim 7, further comprising:
when the network line in use is determined as disconnected, switching to use another one of the network lines to provide the internet service.

9. The fail recovery method of the IoT system of claim 1, further comprising:
periodically uploading the monitoring parameter of the gateway devices to a cloud server.

10. The fail recovery method of the IoT system of claim 9, wherein the step of periodically uploading the monitoring parameter of the gateway devices to the cloud server comprises:
comparing the monitoring parameter stored by the cloud server with the monitoring parameter yet to be uploaded in the gateway devices; and
uploading only the monitoring parameter which was changed to the cloud server.

11. An Internet of Things (IoT) system, comprising:
a plurality of gateway devices, wherein a first gateway device of the plurality of gateway devices preset to provide a wireless network service to at least one IoT device and a second gateway device of the plurality of gateway devices preset to provide the wireless network service to at least one user device,
wherein the gateway devices mutual confirm an operation state of other one of the gateway devices,
wherein when the first gateway device is determined as failed, the second gateway device replaces the first gateway device to simultaneously provide the wireless network service to the IoT device and the user device,
wherein each of the gateway devices comprises:
a backup module, wherein when a monitoring parameter changes, the backup module synchronizes the changed monitoring parameter to the second gateway device;
a connection state confirmation module, configured to exchange a confirmation packet with the other gateway devices so as to confirm operation states of itself and the other gateway devices, and the connection state confirmation module determines whether the confirmation packet is received within a preset time and determines itself as not failed if the confirmation packet is received by the connection state confirmation module with the preset time, and the connection state confirmation module performs a connection state confirmation procedure so as to determine a fault type if the confirmation packet is not received by the connection state confirmation module within the preset time;
a wired transmission circuit, adapted to connect the other gateway devices in a wired manner, wherein when the connection state confirmation module performs the connection state confirmation procedure, the connection state confirmation module sends a connection state confirmation packet by the wired transmission circuit and determines whether a connection state confirmation response is received; the connection state confirmation module determines the respective wireless transmission circuit as normal if the connection state confirmation response is received by the wired transmission circuit, and the connection state confirmation module determines the respective wireless transmission circuit as failed if the connection state confirmation response is not received by the wired transmission circuit;
a memory circuit, storing a plurality of modules including the backup module and the connection state confirmation module; and
a processor, accessing the memory circuit to execute the plurality of modules.

12. The IoT system of claim 11, wherein each of the gateway devices comprises:
a wireless transmission circuit, adapted to connect the user device and the IoT device nearby in a wireless manner; and
a core hardware circuit, comprising:
the memory circuit; and
the processor, coupled to the wireless transmission circuit, the wired transmission circuit and the memory circuit, wherein the processor controls operations of the wireless transmission circuit and the wired transmission circuit, and the modules comprises:
a fail recovery module, configured to, when one of the gateway devices is determined as failed, take over a service providing target of the failed gateway device; and
a service module, configured to enable or disable a corresponding service function according to the current service providing target.

13. The IoT system of claim 12, further comprising:
a switch, connected to the wired transmission circuit of each of the gateway devices, wherein the switch has a plurality of network lines, and the switch uses one of the network lines to provide an internet service to the gateway devices.

14. The IoT system of claim 13, wherein the modules further comprise:
a network connection module, configured to periodically send a connection state confirmation packet via the network line in use, and confirm whether the network line in use is normally connected by determining whether a connection state confirmation response is received,
wherein the network connection module determines the network line in use as normally connected if the connection state confirmation response is received, and the network connection module determines the network line in use as disconnected if the connection state confirmation response is not received.

15. The IoT system of claim 14, wherein when the network connection module determines the network line in use as disconnected, the network connection module switches to use another one of the network lines to provide the internet service.

16. The IoT system of claim 13, wherein the modules further comprise:
the backup module, configured to synchronize at least one monitoring parameter to another gateway device or upload the monitoring parameter to a cloud server.

17. The IoT system of claim 16, wherein the backup module periodically uploads the monitoring parameter to the cloud server.

18. The IoT system of claim 12, wherein when the connection state confirmation module determines the respective wired transmission circuit as normal, the connection state confirmation module sends the confirmation packet to another gateway device by the wireless transmission module instead, and determines whether the confirmation packet sent by the second gateway device is received by the wireless transmission circuit within the preset time; the connection state confirmation module determines the wired transmission circuit of the second gateway device as failed if the confirmation packet is received by the wireless transmission circuit within the preset time, and the connection state confirmation module determines the core hardware circuit of the another gateway device as failed if the confirmation packet is not received by the wireless transmission circuit within the preset time.

19. The IoT system of claim 11, wherein the connection state confirmation module further checks the operation state of the respective wireless transmission circuit, and adds an error code to the sent confirmation packet when the connection state confirmation module determines the respective wireless transmission circuit as failed.

20. A charging system based on Internet of Things (IoT), comprising:
- at least one of a charging device, adapted to apply electricity for charging at least one of a user device;
- a plurality of gateway devices, wherein a first gateway device of the plurality of gateway devices preset to provide a wireless network service to the charging device, and a second gateway device of the plurality of gateway devices adapted to provide the wireless network service to the user device; and
- a data center, adapted to communicate with the gateway devices, and configured to store data messages of the charging device and the user device,
- wherein the gateway devices mutual confirm an operation state of another one of the gateway devices,
- wherein when the first gateway device is determined as failed, the second gateway device replaces the first gateway device to simultaneously provide the wireless network service to the charging device and the user device,
- wherein when a monitoring parameter of the first gateway device changes, synchronizing the changed monitoring parameter to the other gateway devices by the first gateway device,
- wherein each of the gateway devices comprises:
  - a processor;
  - a memory circuit;
  - a connection state confirmation module, configured to exchange a confirmation packet with the other gateway devices so as to confirm operation states of itself and the other gateway devices, and the connection state confirmation module determines whether the confirmation packet is received within a preset time and determines itself as not failed if the confirmation packet is received by the connection state confirmation module with the preset time, and the connection state confirmation module performs a connection state confirmation procedure so as to determine a fault type if the confirmation packet is not received by the connection state confirmation module within the preset time; and
  - a wired transmission circuit, adapted to connect the other gateway devices in a wired manner, wherein when the connection state confirmation module performs the connection state confirmation procedure, the connection state confirmation module sends a connection state confirmation packet by the wired transmission circuit and determines whether a connection state confirmation response is received; the connection state confirmation module determines the respective wireless transmission circuit as normal if the connection state confirmation response is received by the wired transmission circuit, and the connection state confirmation module determines the respective wireless transmission circuit as failed if the connection state confirmation response is not received by the wired transmission circuit,
- wherein the connection state confirmation module stored in the memory circuit and executed by the processor.

21. The charging system based on IoT of claim 20, wherein each of the at least one charging device comprises:
- a charging circuit, configured to charge the user device;
- a communication circuit, configured to communicate with the corresponding gateway device, so as to transmit the collected charging data back to the corresponding gateway device; and
- an operation monitoring circuit, coupled between the charging circuit and the communication circuit.

* * * * *